United States Patent [19]

Tanigawa et al.

[11] Patent Number: 4,604,042

[45] Date of Patent: Aug. 5, 1986

[54] APPARATUS FOR PRODUCING ANISOTROPIC MAGNETS

[75] Inventors: Shigeho Tanigawa; Shuichi Shiina; Kimio Uchida, all of Kumagaya, Japan

[73] Assignee: Hitachi Metals, Inc., Tokyo, Japan

[21] Appl. No.: 618,183

[22] Filed: Jun. 7, 1984

[30] Foreign Application Priority Data

| Jun. 8, 1983 [JP] | Japan | 58-102127 |
| Jun. 29, 1983 [JP] | Japan | 58-117857 |
| Jun. 29, 1983 [JP] | Japan | 58-117864 |
| Aug. 11, 1983 [JP] | Japan | 58-147137 |
| Aug. 26, 1983 [JP] | Japan | 58-155975 |

[51] Int. Cl.⁴ .............................................. B28B 17/00
[52] U.S. Cl. .......................................... 425/3; 264/24; 264/108; 425/78; 425/DIG. 33
[58] Field of Search ............... 264/24, 22, 108; 425/3, 425/DIG. 33, 174, 78; 164/146; 249/134, 135

[56] References Cited

U.S. PATENT DOCUMENTS

| 2,398,018 | 4/1946 | Linley et al. | 164/146 |
| 2,903,329 | 9/1959 | Weber | 264/DIG. 58 |
| 4,441,875 | 4/1984 | Saito et al. | 425/3 |

FOREIGN PATENT DOCUMENTS

| 51-62396 | 5/1976 | Japan . |
| 53-47043 | 12/1978 | Japan . |
| 55-6907 | 2/1980 | Japan . |
| 56-69805 | 6/1981 | Japan . |
| 56-108207 | 8/1981 | Japan . |
| 57-9798 | 2/1982 | Japan . |
| 57-130407 | 8/1982 | Japan . |
| 57-170501 | 10/1982 | Japan . |
| 57-164509 | 10/1982 | Japan . |
| 58-8571 | 2/1983 | Japan . |

Primary Examiner—Jay H. Woo
Assistant Examiner—J. Fortenberry
Attorney, Agent, or Firm—Finnegan, Henderson, Farabow, Garrett & Dunner

[57] ABSTRACT

A mold for producing an anisotropic magnet from a composition essentially consisting of magnetic powder and a binder, a mold body, a cavity for molding the composition in the presence of an anisotropically oriented magnetic field produced by a plurality of first magnets for providing magnetic fluxes for the magnetic field in the cavity, yokes, each provided between the cavity and the first magnets, and second magnets provided on both circumferential sides of the yokes for preventing the leakage of the magnetic fluxes. The first and second magnets are made of permanent magnets such as rare earth cobalt magnets. The mold may be provided at both ends with third magnets for preventing the axial leakage of the magnetic flux from the axial ends of the yokes. Two or more molds may be combined in a single molding apparatus while sharing the first magnets. This mold is suitable for the injection, extrusion or insert molding of bonded magnet rolls, motor rotors, etc.

13 Claims, 12 Drawing Figures

APPARATUS FOR PRODUCING ANISOTROPIC MAGNETS

BACKGROUND OF THE INVENTION (1) Field of the Invention

The present invention relates to a method for manufacturing an anisotropic magnet by molding a mixture of magnetic powder and a binder in an anisotropically oriented magnetic field. It also relates to an apparatus for carrying out the above method.

(2) Description of the Prior Art

In image-reproducing apparatuses (dry-type) such as electrophotographic copiers, facsimile machines and printers, a magnet roll assembly comprising a non-magnetic sleeve and a permanent magnet member having a plurality of magnetic poles fixed to a shaft and received in the sleeve rotatably to each other is generally used as a means for conveying magnetic developers (two-component developers made of magnetic carrier and toner, and one-component magnetic toner, etc.).

Various types of magnet rolls have been proposed so far. One example is a magnet roll comprising a permanent magnet member constituted by a plurality of elongated, anisotropic, permanent magnet blocks fixed onto a central shaft. The above magnet blocks are produced by pressing ferrite powder into the desired block shapes in a magnetic field and sintering them (Japanese Utility Model Publication No. 57-9798). They are disadvantageous in that they are manufactured through many steps. Another example is a magnet roll comprising a permanent magnet member manufactured by fixing a cylindrical, integral, permanent magnet of hard ferrite onto a shaft (for instance, Japanese Patent Publication Nos. 55-6907 and 53-47043). They are, however, generally vulnerable to cracking and breaking during and after sintering because ferrite magnets per se are brittle. So, their yield is not necessarily satisfactory.

There has been proposed a light-weight magnet roll comprising a so-called plastic magnet, which is produced by forming a composition essentially consisting of ferromagnetic power (usually ferrite powder) and a binder (usually thermoplastics, rubbers, etc.) into an integral, cylindrical body by an extrusion or injection molding method, cooling and solidifying the resulting cylindrical magnet molding and anisotropically magnetizing it (Japanese Patent Laid-Open Nos. 56-108207, 57-130407 and 57-164509).

Similarly, anisotropic plastic magnet rings for use in small motors, sensors, generators, etc. have been proposed and put into practical use.

It is known that since a plastic magnet has a lower filling density of the ferromagnetic powder than that of a sintered one, the plastic magnet needs to be subjected to an anisotropic magnetization before and after solidification, in order to obtain as much magnetic strength as a sintered ferrite magnet (Japanese Patent Laid-Open No. 51-62396).

For the purpose of anisotropic magnetization, a conventional method is carried out by using a mold comprising magnet coils arranged around a molding cavity in a mold body. In such a mold, the magnet coils have large numbers of turn and a large current of low voltage or pulses generated by a capacitor-type powder supply are applied thereto to obtain the desired level of a magnetic field as shown in Japanese Patent Publication No. 58-8571. Although the mold of this type has relatively small magnet coils and can prevent the leakage of magnetic flux due to short magnetic flux paths, the magnet coils generate remarkably high Joule heat due to the current of as large as several thousand amperes, necessitating a large and complicated cooling system.

Japanese Patent Laid-Open No. 57-170501 discloses a mold comprising soft-magnetic yokes and non-magnetic spacers arranged alternately around a molding cavity, and magnet coils provided at the outer ends of the yokes outside a mold body. In this mold, since the magnet coils are provided outside the mold body, it is easy to cool them. The mold of this type, however, is disadvantageous in that it needs a large space for the coils, that the yokes through which the magnetic fluxes flow into the molding cavity have to be long because the coils are placed outside the mold body, and that therefore, the magnetic fluxes tend to leak while passing through the yokes, resulting in a weaker magnetic field.

Further, Japanese Patent Laid-Open No. 56-69805 discloses an injection mold comprising a plurality of permanent magnets arranged, in the non-magnetic mold body, around a molding cavity for providing such a magnetic field as to give a plurality of magnetic poles to a magnet molding within the cavity. With only non-magnetic materials filled between the permanent magnets contained in the mold body, however, it is impossible to effectively prevent the magnetic fluxes emanating from the permanent magnets from leaking. As a result, it merely produces magnets with poor magnetic characteristics.

SUMMARY OF THE INVENTION

An object of the present invention is, therefore, to provide a method for manufacturing an anisotropic magnet, using a small and simple apparatus.

Another object of the present invention is to provide a method for manufacturing an anisotropic magnet having excellent magnetic characteristics.

A further object of the present invention is to provide a method for manufacturing an anisotropic magnet having a uniform magnetic flux density distribution in the longitudinal direction thereof.

A still further object of the present invention is to provide an apparatus for manufacturing an anisotropic magnet having excellent magnetic characteristics.

A method for manufacturing an anisotropic magnet according to the present invention comprises extruding or injection-molding a composition essentially consisting of magnetic powder and a binder in a mold in the presence of an anisotropically oriented magnetic field, the mold comprising a plurality of first magnet means arranged around a molding cavity, yokes located between the first magnet means and the molding cavity for flowing the magnetic flux emanating from the first magnet means into the molding cavity, and a plurality of second magnet means located on both sides of the yokes for preventing the leakage of the magnetic flux emanating from the first magnet means.

A mold for manufacturing an anisotropic magnet according to the present invention comprises: a mold body; a cavity for molding a composition essentially consisting of magnetic powder and a binder in the presence of an anisotropically oriented magnetic field; a plurality of first magnet means arranged around the molding cavity for providing magnetic fluxes constituting the above magnetic field; yokes each provided between the cavity and each of the first magnet means for flowing the magnet flux into the cavity; and second magnet means provided on both sides of the yokes for preventing the leakage of the magnetic fluxes.

DESCRIPTION OF THE PREFERRED EMBODIMENTS

Figure 1:
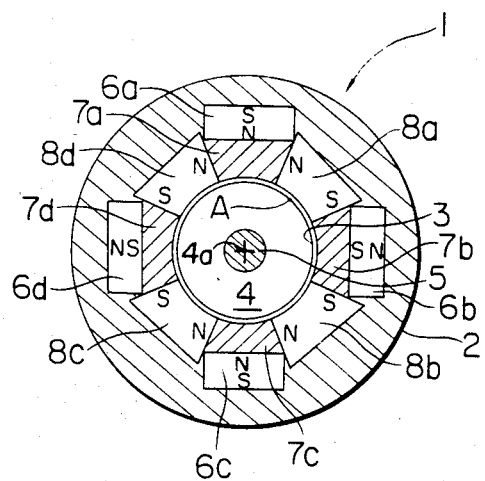
FIG. 1 is a cross sectional view of an injection mold according to one embodiment of the present invention.

Please note that the same reference numerals and symbols are assigned to the corresponding members of the apparatuses as shown in all the figures.

Referring to FIG. 1, a mold 1 comprises a mold body 2, a cylindrical sleeve 3 mounted inside the mold body 2 for defining a molding cavity 4 having a longitudinal axis 4a, and a central core 5. The mold body 2 contains four first magnet means 6a–6d arranged circumferentially around the cylindrical sleeve 3 with their N and S magnetic poles directed toward the molding cavity 4 alternately. Yokes 7a–7d are mounted between the first magnet means 6a–6d and the cylindrical sleeve 3 for flowing the magnet fluxes emanating from the first magnet means 6a–6d into the cavity. A second magnet means 8a is provided between the adjacent yokes 7a and 7b. Likewise, further second magnet means 8b, 8c and 8d are provided between the adjacent yokes 7b and 7c, 7c and 7d, and 7d and 7a, respectively. In this embodiment, the first magnet means 6a and 6c have north poles directed toward the molding cavity 4, and the remaining first magnet means 6b and 6d have south poles directed toward the cavity 4. The two second magnet means 8a and 8d adjacent to the yoke 7a have north poles facing the yoke 7a. Likewise, the north poles of the second magnets 8b and 8c face the yoke 7c which is in contact with the north pole of the first magnet means 6c, and the south poles of the second magnet means 8a and 8b, and 8c and 8d face the yokes 7b and 7d, respectively, each of which is in contact with the south pole of the first magnet means.

As is shown in FIG. 1, the second magnet means are preferably longer than the yokes in the radial direction to such an extent as to fully prevent the leakage of the magnetic fluxes emanating from the first magnet means.

The first and second magnet means may be made of the same or different permanent magnet materials, which may include sintered ferrite magnets, Alnico magnets, Fe-Cr-Co magnets and rare earth magnets. Rare earth magnets including rare earth cobalt magnets such as $SmCo_5$ and $Sm_2Co_{17}$ are particularly suitable to provide a strong magnetic flux. Contrary to magnet coils, the permanent magnet does not generate any heat, so no cooling system is required as far as the Joule heat is concerned. Particularly when a magnet roll which has a large lengthdiameter ratio is manufactured, the overheating of the magnet coils due to the Joule heat is a serious problem, and cooling the coils makes the overall structure of the mold too large and complicated. In this sense, the fact that the mold comprises the first and second magnet means made of permanent magnet materials is very advantageous.

Though the first permanent magnets 6a–6d have a rectangular cross section in this embodiment, they may have any different cross section such as an arcuate one as long as they can provide strong anisotropic magnetization to the cylindrical magnet molding. The yokes 7a–7d may be made of soft-magnetic materials such as iron. The mold body 2 itself may also be made of soft-magnetic materials, so that it can serve as a yoke with a high permeance for circulating each of the magnetic fluxes generated by the first magnet means 6a–6d.

The cylindrical sleeve 3 is mounted inside the mold body 2 to provide a smooth inner surface for ensuring that the resulting magnet molding has a smooth surface and is easily removed from the mold 1.

The essence of the present invention is that the second magnet means 8a–8d arranged between the adjacent pairs of the first magnet means 6a–6d prevent the magnetic fluxes emanating from the first magnet means from leaking so that they may be converged onto the surface of the cavity 4. According to this arrangement of the first and second permanent magnets, effective convergence of magnetic flux in the molding cavity can be achieved, which makes it possible to provide a sufficient magnetic field to give a plurality of strong magnetic poles to the resulting magnet molding without resorting to magnet coils.

Particularly when the mold 1 is provided with a combination of the first and second rare earth cobalt magnets and the soft-magnetic yokes, a high magnetic field necessary for anisotropic magnetization, specifically on the level of 6,000–8,000 Oersted (Oe) may be easily achieved. Rare earth cobalt magnets used need only have residual magnetic flux density (Br) of more than 8,000 Gauss (G), preferably more than 9,000 G, and intrinsic course of coersive force (iHc) of more than 10,000 Oe, preferably more than 15,000 Oe.

Figure 2:
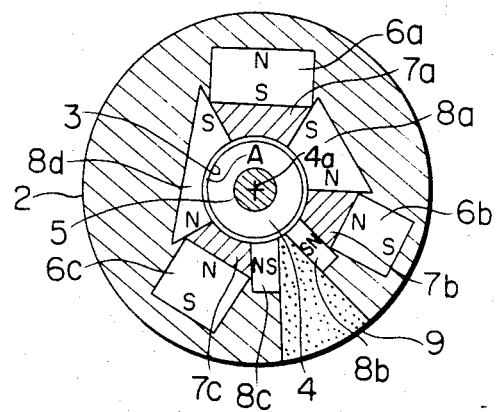
FIG. 2 is a cross sectional view of an injection mold according to another embodiment of the present invention.

FIG. 2 shows another embodiment of the mold. The mold of this embodiment produces a three-pole permanent magnet molding, but it may be easily modified to provide a permanent magnet molding with five or more magnetic poles of odd numbers. This mold comprises a soft-magnetic mold body 2, a non-magnetic cylindrical sleeve 3 mounted inside the mold body 2 to define a cavity 4, a central core 5, three first permanent magnets 6a, 6b and 6c having magnetic poles oriented alternately in the radial direction, three yokes 7a–7c each placed between the first permanent magnet and the cylindrical sleeve 3, four second permanent magnets 8a–8d placed on both sides of the yokes, and a wedge-shaped, non-magnetic spacer 9 placed between the second permanent magnets 8b and 8c. The relationships of the magnetic poles of the first and second magnets are as shown in FIG. 2.

It is to be noted that the non-magnetic spacer 9 is placed between the second permanent magnets 8b and 8c oriented in such a manner that their S poles face the spacer 9, because the first permanent magnets 6b and 6c sandwiching the two second permanent magnets 8b and 8c have the same poles (N) oriented radially toward the molding cavity 4. The non-magnetic spacer 9 serves to reduce the magnetic flux between the adjacent first permanent magnets to substantially zero.

Figure 3:
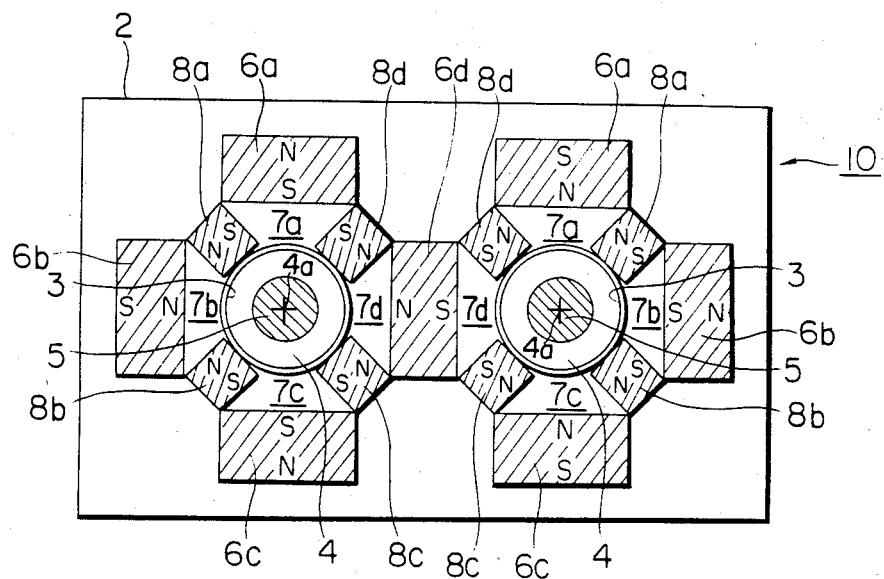
FIG. 3 is a cross sectional view of a double-cavity injection mold according to a further embodiment of the present invention.

According to the present invention, two or more molds may be combined in a single molding apparatus. FIG. 3 shows an example of such a molding apparatus 10. Each mold unit has substantially the same structure as that of the apparatus of FIG. 1. That is, it comprises a non-magnetic cylindrical sleeve 3 for defining a central molding cavity 4, a core 5 placed at the center of the cavity 4, first permanent magnets 6a–6d mounted around the sleeve 3 in such a manner that their magnetic poles are alternately oriented in the radial direction of the cavity 4, yokes 7a–7d each mounted between the sleeve 3 and each of the permanent magnets 6a–6d, and second permanent magnets 8a–8d each having magnetic poles directed circumferentially of the sleeve 3 and placed between the yokes. Both N poles of the second permanent magnets 8a and 8d face the yoke 7a which is in contact with the N pole of the first permanent magnet 6a. The same is true of the other second permanent magnets. In the embodiment as shown in FIG. 3, the molding apparatus 10 comprises two mold units in a soft-magnetic body 2, sharing the common first permanent magnet 6d.

Figure 4:
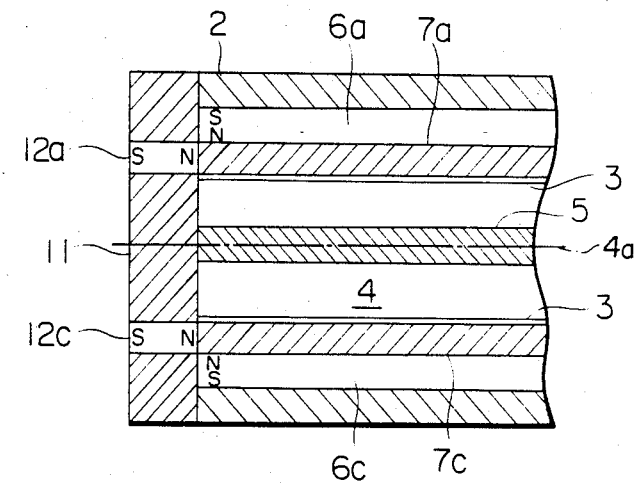
FIG. 4 is a side cross sectional view of an injection mold according to a still further embodiment of the present invention.
Figure 5:
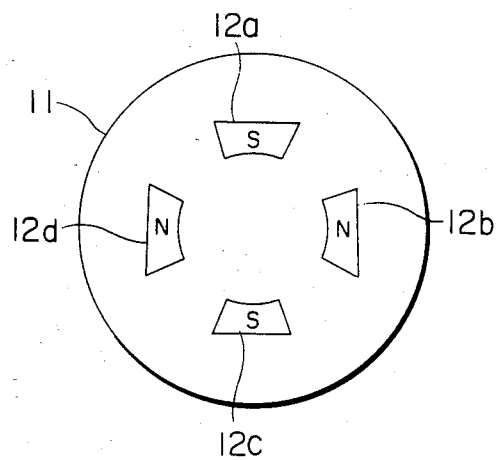
FIG. 5 is an end view of the injection mold of FIG. 4.

According to a further embodiment of the present invention as shown in FIGS. 4 and 5, an end yoke 11 of the mold 1 may be provided with third magnet means 12a–12d made of permanent magnet materials each provided adjacent to the end of each of the yokes 7a–7d. The N pole of the third magnet 12a is in contact with the end of the yoke 7a which is in turn in contact with the N pole of the first permanent magnet 6a. As a result, the third permanent magnet 12a works to prevent the magnetic flux emanating from the first permanent magnet 6a from leaking outwardly in the axial direction. The same is true of the remaining third magnets 12b–12d. Thus, an axially uniform magnetic flux density distribution can be achieved at the ends of the mold 1.

The above-mentioned molds are particularly suitable for manufacturing bonded magnets with a plurality of magnetic poles.

Ferromagnetic powder, plastics and if necessary, additives are mixed, and injected or extruded in a molten state into the mold of the present invention. The solidified magnet member is removed from the mold.

Any ferromagnetic powder may be used. Typical examples of the useful magnetic powder are ferrite powder, Alnico powder, Fe-Cr-Co magnetic powder, rare earth-cobalt magnet powder, etc. Ferrite powder may have the general formula: $MO \cdot n Fe_2O_3$, wherein M represents one or more of Ba, Sr and Pb and n is 5–6. The ferrite powder has preferably an average particle size of 0.9–2.5 μm. One preferred example is ferrite powder having the above formula with the molar ratio "n" of 5.0–5.8, which is obtained by mixing $BaCO_3$ or $SrCO_3$ with $Fe_2O_3$, incinerating the mixture at 1,150°–1,300° C., and annealing it at 800°–1,000° C. to remove the strain remaining therein. Good magnetic characteristics are obtained when a mixture of Ba-ferrite powder and Sr-ferrite powder in the appropriate proportion is used. Specifically, the Ba-ferrite powder preferably occupies 5–25% of the total weight of the ferrite powder mixture. Why good magnetic characteristics can be obtained by the combination of Sr-ferrite and Ba-ferrite has not yet been fully theorized, but the following hypothesis which does not bind the present invention may be proposed: When Sr-ferrite powder having an intrinsic coercivity of 3,000–5,000 Oe alone is used in the mold comprising the permanent magnets providing the oriented magnetic field of 6,000–8,000 Oe, the resulting magnet molding is anisotropically magnetized only to the extent of 75–85% of the saturation magnetization thereof. The inclusion of an appropriate amount of Ba-ferrite having as high a saturated magnetic flux density (σs) as that of Sr-ferrite and an intrinsic coercivity of 2,000–3,000 Oe can substantially enhance the anisotropic magnetization of the magnet molding.

Plastics which may be used in the present invention include thermoplastics such as styrene-butadiene copolymers, ethylene-vinyl acetate copolymers, polyethylene and polyamides.

The proportion of magnetic powder to resins may be 80–96:20–4, preferably more than 85:15 by weight. When the ferromagnetic powder is less than 80% by weight, the desired magnetic characteristics (residual magnetic flux density on the magnet surface: more than 1,200 Oe) can hardly be achieved. On the other hand, when it exceeds 96 wt. %, the molding of the magnet powder-plastics composition becomes extremely difficult.

Ferromagnetic powder may be coated with organic silicon compounds, organic titanate compounds, etc. to improve its adhesion to the plastics.

Beside the magnetic powder and the plastics, a few percentage by weight of lubricants such as polyethylene wax, molybdenum disulfide and calcium stearate, and such additives as acid-amide compounds may be added to improve the moldability of the molten blend.

The molten mixture of magnetic powder and plastics is extruded or injected into the mold 1. Since the molding cavity is in a magnetic field created by a set of the first permanent magnets, the magnetic powder uniformly dispersed in the molten blend is anisotropically magnetized by the oriented magnetic field.

The resulting magnet molding may be worked to have the desired shape and dimension. If the molding cavity is designed to have a shape and dimension suitable for particular applications such as magnet rolls, motor rotors, etc., the resulting magnet molding may be used for such applications without requiring further working. It is noted that a cylindrical molding cavity is highly suitable for manufacturing a cylindrical magnet roll or any other cylindrical magnet member.

The magnet molding is then fixed with a central shaft, if necessary. It is to be noted, however, that a shaft can be placed in the molding cavity in advance instead of the core to provide directly a magnet molding having a shaft. This so-called insert-molding method is particularly suitable for manufacturing a magnet roll having a large length to diameter ratio.

The magnet molding can have any shape and dimension simply by selecting the shape and dimension of the molding cavity. When the molding cavity has a length to diameter ratio as large as about 5 or more, practically more than 10, the resulting magnet molding is suitable for a magnet roll which is to be used in an electrophotographic copier, a facsimile machine, a printer, etc. On the other hand, when the above ratio is less than 2, the resulting magnet molding is suitable for a rotor of a motor, a generator, etc.

The present invention will be explained in further detail by means of the following Examples.

EXAMPLE 1

Figure 6:
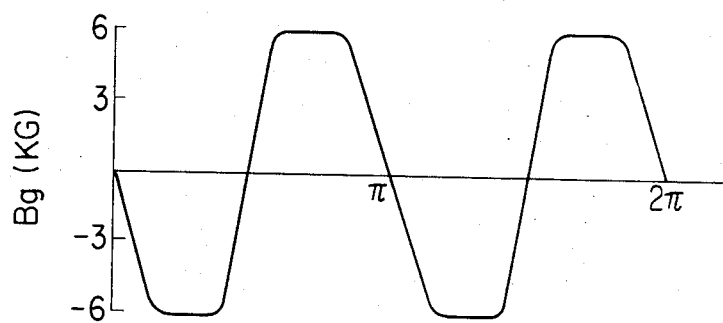
FIG. 6 is a graph showing a magnetic flux density distribution on the inner surface of the mold of FIG. 1 in the circumferential direction.

7.65 kg of ferrite powder ($BaO.6Fe_2O_3$) having an average particle size of 1 $\mu$m was mixed with 1.35 kg of nylon 6 (1011 FB, Ube Kosan K.K.) and blended in a kneader at 250° C. The mixture was introduced into an injection molding machine equipped with the mold as shown in FIG. 1. The mold 1 was provided with the first and second permanent magnets 6a-6d and 8a-8d made of rare earth cobalt (H-22A, Hitachi Metals, Ltd.) having Br of 9,000 G and iHc of 10,000 Oe, and the body 2 and the yokes 7a-7d both made of steel. The inner surface of the molding cavity 4 had a magnetic flux density distribution in the clockwise direction as shown in FIG. 6, wherein the origin of the graph is indicated by the point A in FIG. 1. The injection molding was conducted at 270° C. and 1,000 kg/cm$^2$ (70 kg/cm$^2$ gauge).

Figure 7:
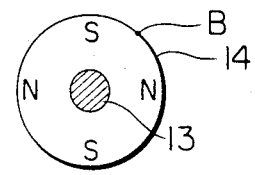
FIG. 7 is a cross-sectional view of a magnet roll prepared using the mold of FIG. 1.

The resulting magnet molding of 30 mm in outer diameter, 12 mm in inner diameter and 260 mm in length was subjected to cutting to have the outer diameter of 24 mm. A shaft 13 was fixed into the central bore of the magnet molding to provide an anisotropic magnet roll 14 as shown in FIG. 7. It is to be noted that the magnetic poles of the magnet molding are just opposite to those of the first permanent magnets 6a-6d located at the corresponding positions.

Figure 8:
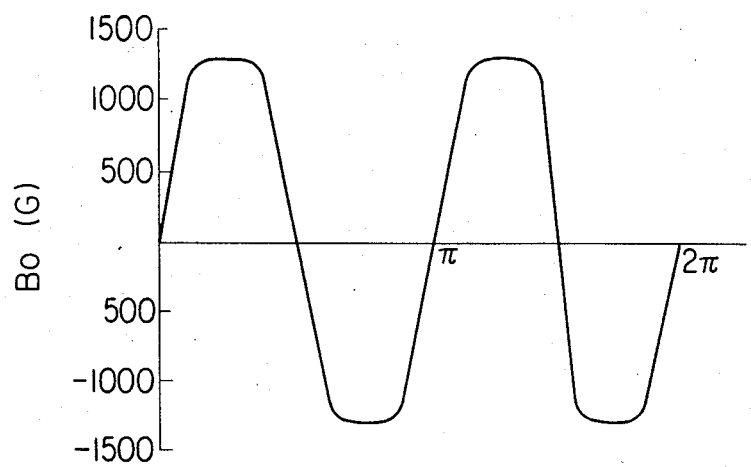
FIG. 8 is a graph showing Bo a magnetic flux density distribution on the surface of the magnet roll of FIG. 7 in the circumferential direction.

The resulting magnet roll had a surface magnetic flux density distribution as shown in the graph of FIG. 8 whose origin is indicated by the point B in FIG. 7, which corresponds to the point A in FIG. 1. It has been confirmed that this anisotropic magnet roll has magnetic characteristics of almost the same level as those obtained by a rubber press method.

EXAMPLE 2

Figure 9:
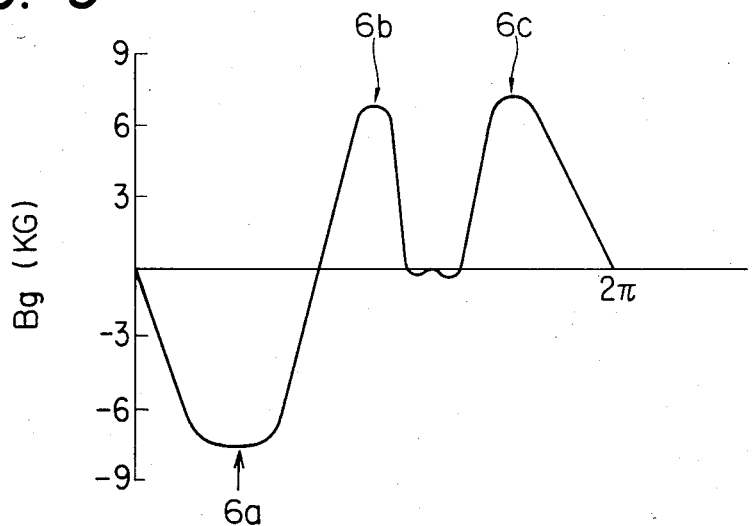
FIG. 9 is a graph showing Bg a magnetic flux density distribution on the inner surface of the mold of FIG. 2 in the circumferential direction.

7.65 kg of ferrite powder ($BaO.6Fe_2O_3$) having an average particle size of 1 $\mu$m was mixed with 1.35 kg of nylon 6 (1011 FB, Ube Kosan K.K.) and blended in a kneader at 250° C. The mixture was introduced into an injection molding apparatus equipped with the mold as shown in FIG. 2. The mold was provided with the first and second permanent magnets 6a-6c and 8a-8d made of rare earth cobalt magnet materials (H-22A, Hitachi Metals, Ltd.) having Br of 9,000 G and iHc of 10,000 Oe, and the body 2 and the yokes 7a-7c both made of steel. The inner surface of the molding cavity 4 had a magnetic flux density distribution in the clockwise direction as shown in the graph of FIG. 9 whose origin is indicated by the point A in FIG. 2. The injection molding was conducted at 270° C. and 1,000 kg/cm$^2$ (70 kg/cm$^2$ gauge).

The resulting magnet molding of 30 mm in outer diameter, 12 mm in inner diameter and 260 mm in length was subjected to cutting to have the outer diameter of 24 mm. A shaft 13 was fixed into the central bore of the magnet molding to provide an anisotropic magnet roll 14 as shown in FIG. 10.

Figure 10:
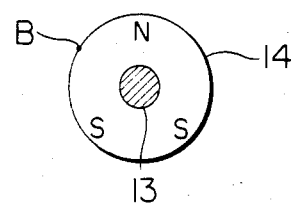
FIG. 10 is a cross-sectional view of a magnet roll prepared using the mold of FIG. 2.
Figure 11:
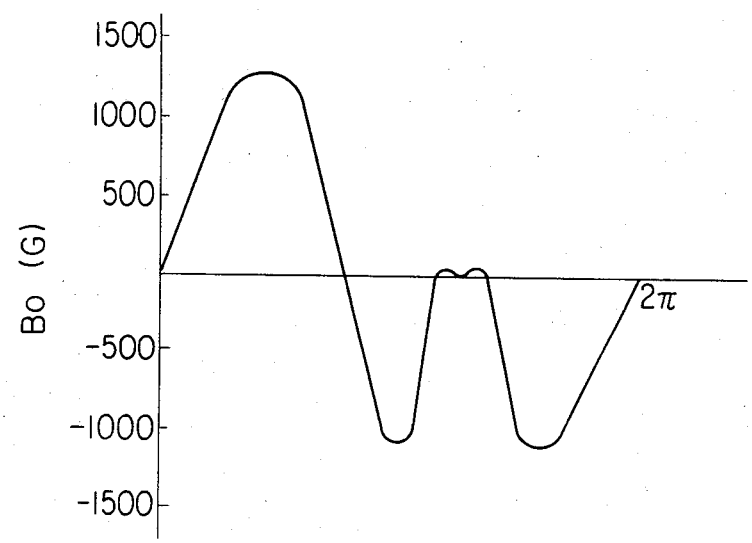
FIG. 11 is a graph showing a magnetic flux density distribution on the surface of the magnet roll of FIG. 10 in the circumferential direction.

The resulting magnet roll 14 had a surface magnetic flux density distribution in the clockwise direction as shown in the graph of FIG. 11 whose origin is indicated by the point B in FIG. 10, which corresponds to the point A in FIG. 2. It has also been confirmed that this anisotropic magnet roll has magnetic characteristics of almost the same level as those obtained by the rubber press method.

EXAMPLE 3

9.2 kg of rare earth cobalt magnet powder {$Sm(Co_{0.68}Fe_{0.23}Cu_{0.07}Hf_{0.02})_{7.1}$} having an average particle size of 1 $\mu$m was mixed with 0.8 kg of a polyamide resin (nylon 12) in a batch-type kneader at about 240° C. The mixture was introduced into the injection molding apparatus equipped with two mold units as shown in FIG. 3. Each mold unit was provided with the first permanent magnet means 6a-6d of $SmCo_5$ permanent magnet having a dimension of 20 mm × 10 mm × 10 mm (Br=9,200 G, iHc=8,500 Oe, a maximum energy product $(BH)_{max}$=22 Mega Gauss Oersted MG Oe), and the second permanent magnet means of ferrite magnet (Br=3,800 G, iHc=2,400 Oe, $(BH)_{max}$=3.5 MG Oe). The yokes 7a-7d and the base 2 was made of SS-type steel, and the molding cavity 4 had a dimension of 30 mm outer diameter, 20 mm inner diameter, and a height of 30 mm (30 mm0 × 20 mm0 × 30 mm). The injection molding was conducted at 270° C. and 1,000 kg/cm$^2$ gauge).

The resulting cylindrical bonded magnet member had good anisotropic magnetic characteristics of four magnetic poles.

EXAMPLE 4

8.5 kg of ferrite powder ($SrO.5.6Fe_2O_3$) having an average particle size of 1.5 $\mu$m was mixed with 1.5 kg of a polyamide resin (nylon 12) and blended in a batch-type kneader at about 200° C. The blend was introduced into an injection molding apparatus equipped with the mold as shown in FIGS. 4 and 5. The mold was provided with the first magnet means 6a-6d of rare earth cobalt magnet (Br =9,200 G, iHc=15,000 Oe), and the second and third magnet means 8a-8d and 12a-12d of Alnico magnet (Br=7,500 G, iHc=16,000 Oe). The injection molding was conducted at 270° C. and 1,000 kg/cm$^2$ (70 kg/cm$^2$ gauge)

The resulting magnet molding of 30 mm in outer diameter, 10 mm in inner diameter and 330 mm in length was subjected to cutting to have the outer diameter of 28 mm. A shaft 13 was fixed into the central bore of the magnet molding, and anisotropic magnetization was performed thereon to provide a four-pole magnet roll. The magnet roll had a good circumferential magnetic flux density distribution which is substantially the same as shown in FIG. 8.

Figure 12:
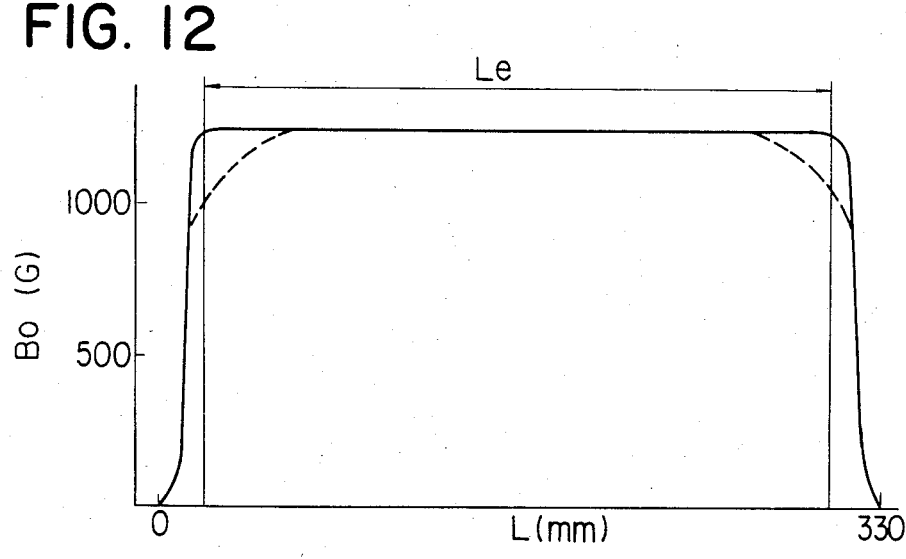
FIG. 12 is a graph showing a magnetic flux density distribution on the surface of a magnet roll prepared in Example 4 in the axial direction.

FIG. 12 shows a magnetic flux density distribution of the magnet roll at the N pole in the axial direction. FIG. 12 also shows by the broken line a magnetic flux density distribution of a magnet roll obtained by using a conventional mold having magnet coils energized by pulses generated by a capacitor-type power supply. The comparison of these two lines clearly shows that the magnetic flux density distribution of the magnet roll of the present invention is extremely more uniform in the axial direction at both ends than that of the conventional magnet roll. The effective length (Le) of the magnet roll has been expanded by using the mold comprising the third magnet means 12a-12d at both axial ends.

EXAMPLE 5

50 kg of Sr-ferrite powder (n=5.8) was prepared by mixing $SrCO_3$ with $Fe_2O_3$, incinerating the mixture at 1,200° C. for 60 minutes, pulverizing it to an average particle size of 1 μm and annealing the powder at 900° C. for 30 minutes. Similarly, 50 kg of Ba-ferrite powder (n=5.8) was prepared by mixing $BaCO_3$ with $Fe_2O_3$, incinerating the mixture at 1,250° C. for 60 minutes, pulverizing it to an average particle size of 1 μm, and annealing the powder at 800° C. for 30 minutes.

Mixtures of these ferrite powders at various ratios, a polyamide resin (nylon 6, Toray, Ltd.) and polyethylene wax (H1WAX200, Mitsui Petrochemical Co., Ltd.) were used in the following experiments.

10 kg of five ferrite powder samples containing various proportions of Ba-ferrite were prepared, and each ferrite powder sample was mixed with 1.65 kg of a resin mixture of the polyamide resin and the polyethylene wax in the ratio of 5:1 by weight, and kneaded at 240° C. Each of the resulting blends was introduced into an injection molding apparatus equipped with the mold of FIG. 1. The mold was provided with the first and second magnet means of race earth cobalt magnet (H-22A, Hitachi Metals, Ltd.) of Br=9,000 G and iHc=10,000 Oe. The inner surface of the molding cavity had a magnetic flux density distribution as shown in FIG. 6. The injection molding was conducted at 260° C. and 1,000 $kg/cm^2$ (70 $kg/cm^2$ gauge).

Each of the resulting magnet moldings of 30 mm in outer diameter, 12 mm in inner diameter and 260 mm in length was subjected to cutting treatment to have the outer diameter of 24 mm, and then to anisotropic magnetization to provide a four-pole anisotropic permanent magnet. The magnetic properties of these permanent magnets are shown in Table 1.

TABLE 1

| Sample No. | Ba—Ferrite Content (Wt. %) | Bo* (G) |
| --- | --- | --- |
| 1 | 0 | 1100 |
| 2 | 2 | 1100 |
| 3 | 5 | 1250 |
| 4 | 10 | 1400 |
| 5 | 20 | 1400 |

Note:
*Values at the N pole

It is noted that the magnetic flux density distribution of Sample No. 3 is substantially the same as shown in FIG. 8.

It has been found that the inclusion of about 5 wt. % or more of Ba-ferrite provides a permanent magnet product with good magnetic characteristics.

EXAMPLE 6

A ferrite powder mixture containing 5 wt. % Ba-ferrite powder (Sample No. 3 in Example 5) was prepared, and various amounts of this ferrite powder mixture were used to prepare five magnetic powder-resin blends in the same manner as in Example 5. Anisotropic permanent magnets were manufactured therefrom under the same conditions as in Example 5. The magnetic characteristics of the resultant cylindrical anisotropic permanent magnets are shown in Table 2. It is noted that Table 2 also shows in Nos. 6 and 7 the magnetic characteristics of permanent magnets manufactured by using the resin containing only polyamide, for the purpose of comparison.

TABLE 2

| Sample No. | Ferrite Powder Content (Wt. %) | Bo (G) |
| --- | --- | --- |
| 1 | 82 | 1000 |
| 2 | 85 | 1200 |
| 3 | 87 | 1300 |
| 4 | 89 | 1400 |
| 5 | 90 | 1500 |
| 6 | 87 | 1050 |
| 7 | 87 | 1050 |

It can be seen that when 85 wt. % or more of ferrite powder is used, good magnetic characteristics are obtained.

EXAMPLE 7

The experiment of Example 5 was repeated under the same conditions except for using the mold of FIG. 2. The results are shown in Table 3. The magnetic field distribution in the molding cavity is shown in FIG. 9.

TABLE 3

| Sample No. | Ba—Ferrite Content (Wt. %) | Bo (G) |
| --- | --- | --- |
| 1 | 0 | 1100 |
| 2 | 2 | 1100 |
| 3 | 5 | 1250 |
| 4 | 10 | 1400 |
| 5 | 20 | 1400 |

The magnetic flux density distribution of the cylindrical permanent magnet (Sample No. 3 in Table 3) was substantially the same as shown in FIG. 11.

EXAMPLE 8

Anisotropic permanent magnets were manufactured under the same conditions as in Example 6 except for using the mold of FIG. 2. The results are shown in Table 4.

TABLE 4

| Sample No. | Ferrite Powder Content (Wt. %) | Bo (G) |
| --- | --- | --- |
| 1 | 82 | 1000 |
| 2 | 85 | 1250 |
| 3 | 87 | 1300 |
| 4 | 89 | 1400 |
| 5 | 90 | 1550 |

The present invention has been described above with reference to the preferred embodiments, but it is to be noted that the present invention is not restricted to them, and that it may be modified and changed without departing from the spirit and scope of the present invention.

What is claimed is:

1. A mold for producing an anisotropic magnet comprising:
   a mold body;
   a cavity having a longitudinal axis for molding a composition essentially consisting of magnetic powder and a binder in the presence of an anisotropically oriented magnetic field;
   a plurality of first magnet means arranged around said molding cavity circumferentially with respect to said cavity axis for providing magnetic fluxes constituting said magnetic field;

a plurality of yokes each provided between said cavity and each of said first magnetic means for flowing said magnet flux into said cavity; and second magnet means provided on both sides of said yokes for preventing the leakage of said magnetic fluxes in the circumferential direction.

2. A mold according to claim 1, wherein the number of said first magnet means is odd, and a non-magnetic spacer is provided between the two second magnet means with the same magnetic poles facing each other, thereby reducing the magnetic flux at the cavity surface adjacent to said non-magnetic spacer to substantially zero.

3. A mold according to claim 1, wherein each of said yokes extends in the axial direction and terminates at opposed axial yoke ends, the mold further comprising third magnet means arranged at the axial ends of said yokes, in such a manner that the magnetic pole of each third magnet means facing each of said yokes is the same as that of said first magnet means contacting with said each yoke, thereby preventing the magnetic fluxes from leaking axially.

4. A mold according to claim 1, wherein each of said second magnet means is arranged such that each magnetic pole thereof faces the yoke which is in contact with the same magnetic pole of said first magnet means.

5. A mold according to claim 3, wherein said first, second and third magnet means are made of permanent magnet.

6. A mold according to claim 5, wherein said first magnet means are made of rare earth cobalt magnet.

7. A mold according to claim 6, wherein said yokes are made of soft-magnetic materials.

8. A mold according to claim 7, wherein said mold body is also made of soft-magnetic materials, so that it serves as means for conducting the magnetic flux.

9. A mold according to claim 1, wherein said cavity is defined by a non-magnetic sleeve.

10. A mold according to claim 1, wherein said molding cavity is cylindrical and comprises a central core.

11. A mold according to claim 1, wherein said molding cavity is cylindrical and receives a shaft which is adapted to be fixed to the resulting magnet molding.

12. A mold according to claim 1, wherein the to diameter ratio of said cavity is more than 5, whereby it is suitable for producing a magnet roll.

13. An apparatus comprising at least two molds as set forth in claim 1 positioned adjacent one another, wherein one first magnet means is shared by the adjacent molds.

* * * * *

UNITED STATES PATENT AND TRADEMARK OFFICE
CERTIFICATE OF CORRECTION

PATENT NO. : 4,604,042

DATED : August 5, 1986

INVENTOR(S) : SHIGEHO TANIGAWA ET AL.

It is certified that error appears in the above-identified patent and that said Letters Patent is hereby corrected as shown below:

Claim 12, line 1, insert --length-- after "the".

Signed and Sealed this

Fourteenth Day of October, 1986

[SEAL]

*Attest:*

DONALD J. QUIGG

*Attesting Officer*      *Commissioner of Patents and Trademarks*